(12) United States Patent
Hainsworth et al.

(10) Patent No.: US 6,199,793 B1
(45) Date of Patent: Mar. 13, 2001

(54) SYSTEM FOR DEPLOYMENT AND RETRIEVAL OF AIRBORNE TOWED VEHICLES

(75) Inventors: Barton J. Hainsworth, Huntington; William F. Beaver, Jr., Hamden, both of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/330,655

(22) Filed: Jun. 11, 1999

(51) Int. Cl.$^7$ .................................................... B64D 3/02
(52) U.S. Cl. ....................................... 244/1 TD; 244/137.4
(58) Field of Search ............................ 244/1 TD, 137.4, 244/17.11

(56) References Cited

U.S. PATENT DOCUMENTS

| | | | |
|---|---|---|---|
| 4,890,751 | * | 1/1990 | Opdahl ............................... 244/1 TD |
| 5,494,240 | * | 2/1996 | Waugh ............................... 244/137.4 |
| 5,762,297 | * | 6/1998 | Ascherin et al. ................. 244/137.4 |
| 5,904,323 | * | 5/1999 | Jakubowski, Jr. et al. ....... 244/137.4 |

* cited by examiner

*Primary Examiner*—J. Woodrow Eldred
(74) *Attorney, Agent, or Firm*—Seidel Gonda Lavorgna & Monaco, PC (57) ABSTRACT

A towed vehicle deployment and retrieval system for attachment to an aircraft. The system includes a pylon support that is designed to mount to an aircraft and project outward therefrom. A stores pylon is mounted to the pylon support. The stores pylon has at least one swaybrace reciprocally attached to it for removably engaging with a towed vehicle. The system also includes a winch that is configured for mounting within the aircraft. The winch controls the feeding and retrieval of a winch cable that is attached to the towed vehicle. A tow cable is removably attached to the aircraft and is engaged with the winch cable using a tow pole such that the tow cable fully supports the towed vehicle when the towed vehicle is in the towing position. A method is also disclosed for attaching a winch cable and towed vehicle to a tow cable.

16 Claims, 12 Drawing Sheets

SYSTEM FOR DEPLOYMENT AND RETRIEVAL OF AIRBORNE TOWED VEHICLES

FIELD OF THE INVENTION

The present invention relates to airborne towed vehicles and, more particularly, to a helicopter mounted system for the deployment and retrieval of airborne towed vehicles.

BACKGROUND OF THE INVENTION

Mines and similar water submersed explosive devices can cause significant damage to naval vessels, not to mention harm and/or death to personnel on such vessels. One of the methods currently employed to detect and destroy submersed mines is by dragging a towed vehicle over the area of concern. The towed vehicle is submersed behind an aircraft and includes electrical circuitry for detecting and destroying submersed mines. Raytheon Corporation makes an AQ-S20 towed vehicle which is submersible and controlled via fiber optics embedded into a tow cable. Typically, the towed vehicle is hauled behind a helicopter during an Airborne Mine Countermeasures (AMCM) mission. The importance of the AMCM mission was highlighted during the Persian Gulf War when three US Navy warships struck World War I era mines, causing significant damage to the ships and nearly sinking one.

Currently, the AMCM towing mission is performed using a Sikorsky Aircraft Corporation S-65 series aircraft, particularly, the US Navy MH-53E and the Japan Naval Defense Force S-80M. These aircraft are very large and include an interior cabin with a retractable ramp. An airborne towed vehicle is retained within the cabin until deployment. The towed vehicle is stored in a cradle which can be moved fore and aft in the cabin. When it is desired to deploy the towed vehicle, the cradle is moved to the rear ramp. An A-frame assembly mounted to the aircraft above the ramp is used to lift the towed vehicle from the cradle. The cradle is then moved away and the ramp is lowered to a vertical position, clearing the area beneath the suspended towed vehicle. The towed vehicle is then lowered into the water using a cabin mounted winch. The cable that supports the towed vehicle includes a tow ball which is designed to engage with a hook formed on a tow boom mounted to the helicopter. This allows the tow boom and helicopter to support the towing loads and unload the winch. The operation is reversed to recover and stow the vehicle.

Due to the large size of the S-65 aircraft used in the AMCM mission, these aircraft are only compatible with large naval vessels, such as helicopter/aircraft carriers. To meet the diverse needs of the Navy, the United States military currently maintains forces that are dedicated to performing the AMCM mission. These forces are deployed to areas of concern on an as-needed basis. Accordingly, deployed naval forces must wait until the AMCM forces to arrive, detect and clear the area of mines.

A need therefore exists for a more versatile airborne towed vehicle deployment and retrieval system that can be used with smaller aircraft which are more readily available to the naval forces.

SUMMARY OF THE INVENTION

The present invention relates to a towed vehicle deployment and retrieval system for attachment to an aircraft. The system includes a pylon support that is designed to mount to an aircraft and project outward therefrom. A stores pylon is mounted to the pylon support. The stores pylon has at least one swaybrace reciprocally attached to it for removably engaging with a towed vehicle.

The system also includes a winch that is configured for mounting within the aircraft. The winch controls the feeding and retrieval of a winch cable that is attached to the towed vehicle.

A tow cable is removably attached to the aircraft and is engaged with the winch cable using a tow pole such that the tow cable fully supports the towed vehicle when the towed vehicle is in the towing position.

The foregoing and other features and advantages of the present invention will become more apparent in light of the following detailed description of the preferred embodiments thereof as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

The following discussion includes a description of the invention as it is intended in connection with one or more preferred embodiments. It should be understood that the following description is not intended to limit the invention to those embodiments. On the contrary, it is intended that the invention cover all alternatives, modifications and equivalents as may be included within its spirit and scope as defined by the appended claims.

Certain terminology is used herein for convenience only and is not to be taken as a limitation on the invention. Particularly, words such as "upper," "lower," "left," "right," "horizontal," "vertical," "upward," and "downward" merely describe the configuration shown in the figures. Indeed, the components may be oriented in any direction and the terminology, therefore, should be understood as encompassing such variations unless specified otherwise.

Figure 1:
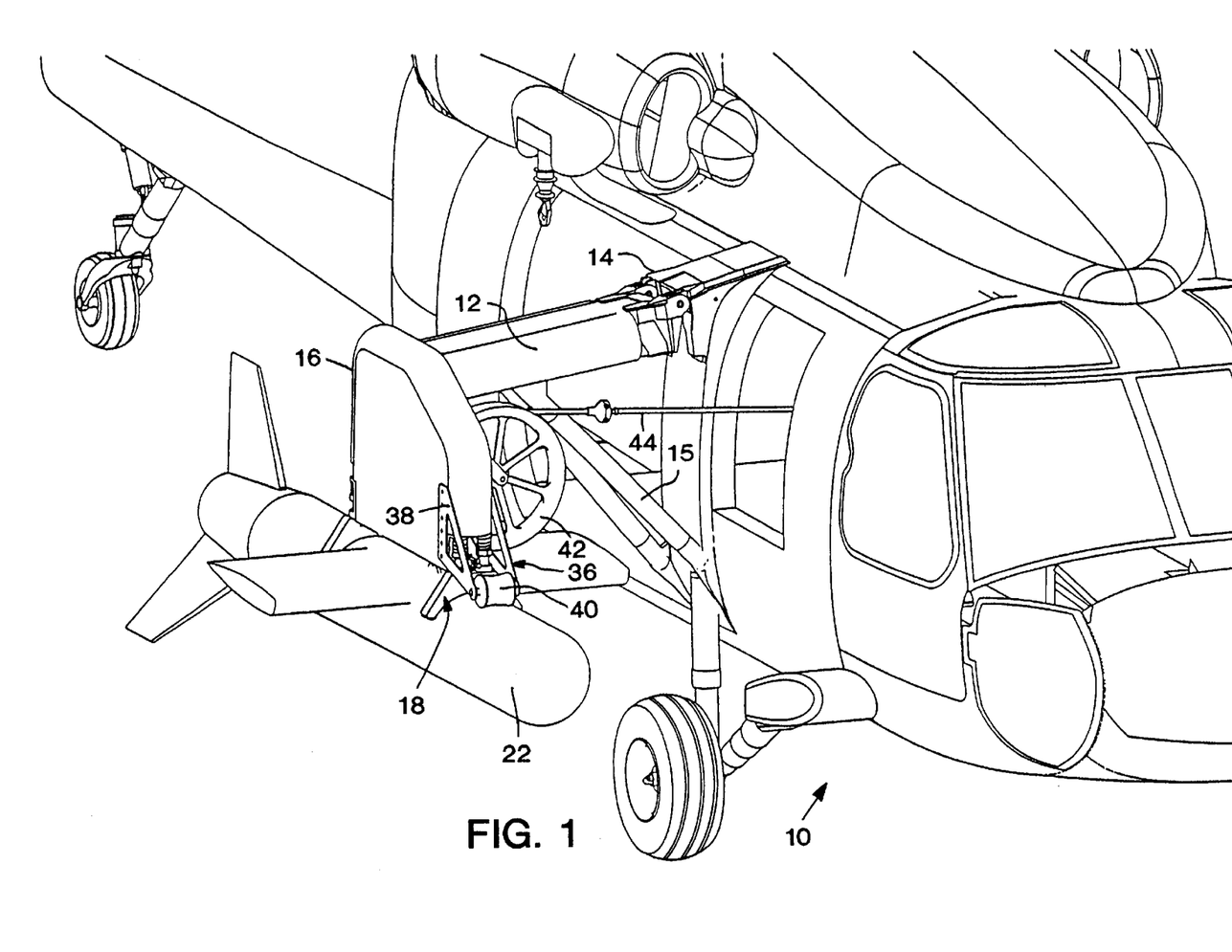
FIG. 1 is an isometric view of a portion of a Sikorsky Aircraft Corporation H-60 series helicopter with a pylon mounted towed vehicle.

Referring now to the drawings, wherein like reference numerals illustrate corresponding or similar elements throughout the several views, the present invention is illustrated in a helicopter mounted embodiment as it is currently contemplated. FIG. 1 is an isometric view of a portion of a Sikorsky Aircraft Corporation H-60 helicopter aircraft 10. In this embodiment, the helicopter 10 includes a pylon support 12 that is mounted to the aircraft through a fitting 14 and support struts 15. The fitting and support struts are similar to those used to attach the External Stores Support System (ESSS) that is currently used on the H-60 series helicopters. A stores pylon 16 is attached to the pylon 12. preferably at its distal end. The stores pylon 16 includes a pylon stowage system 18 on the bottom of the stores pylon 16.

Figure 2A:
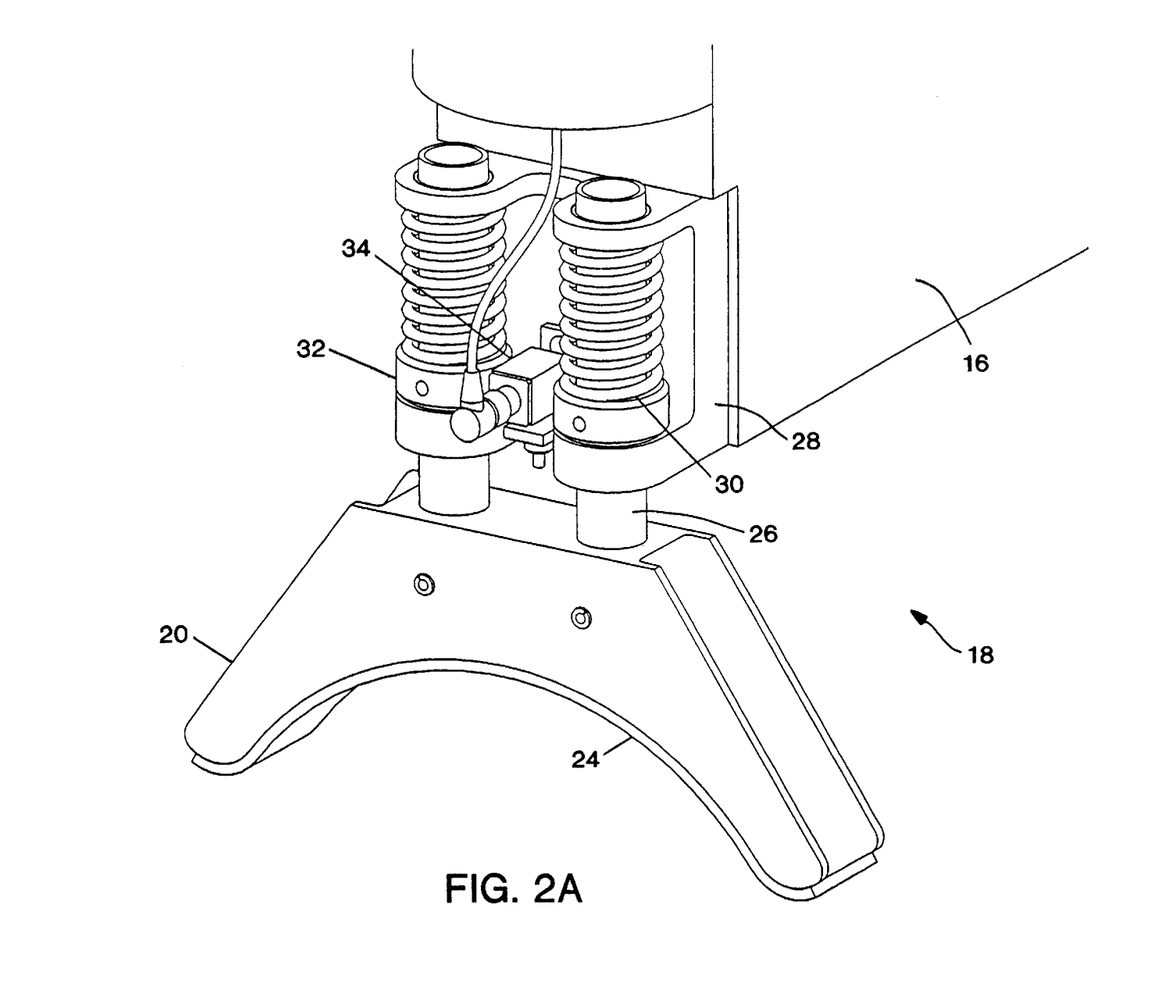
FIGS. 2A and 2B are isometric views of a mechanism for engaging a towed vehicle to a stores pylon showing the mechanism with the towed vehicle engaged and disengaged.
Figure 2B:
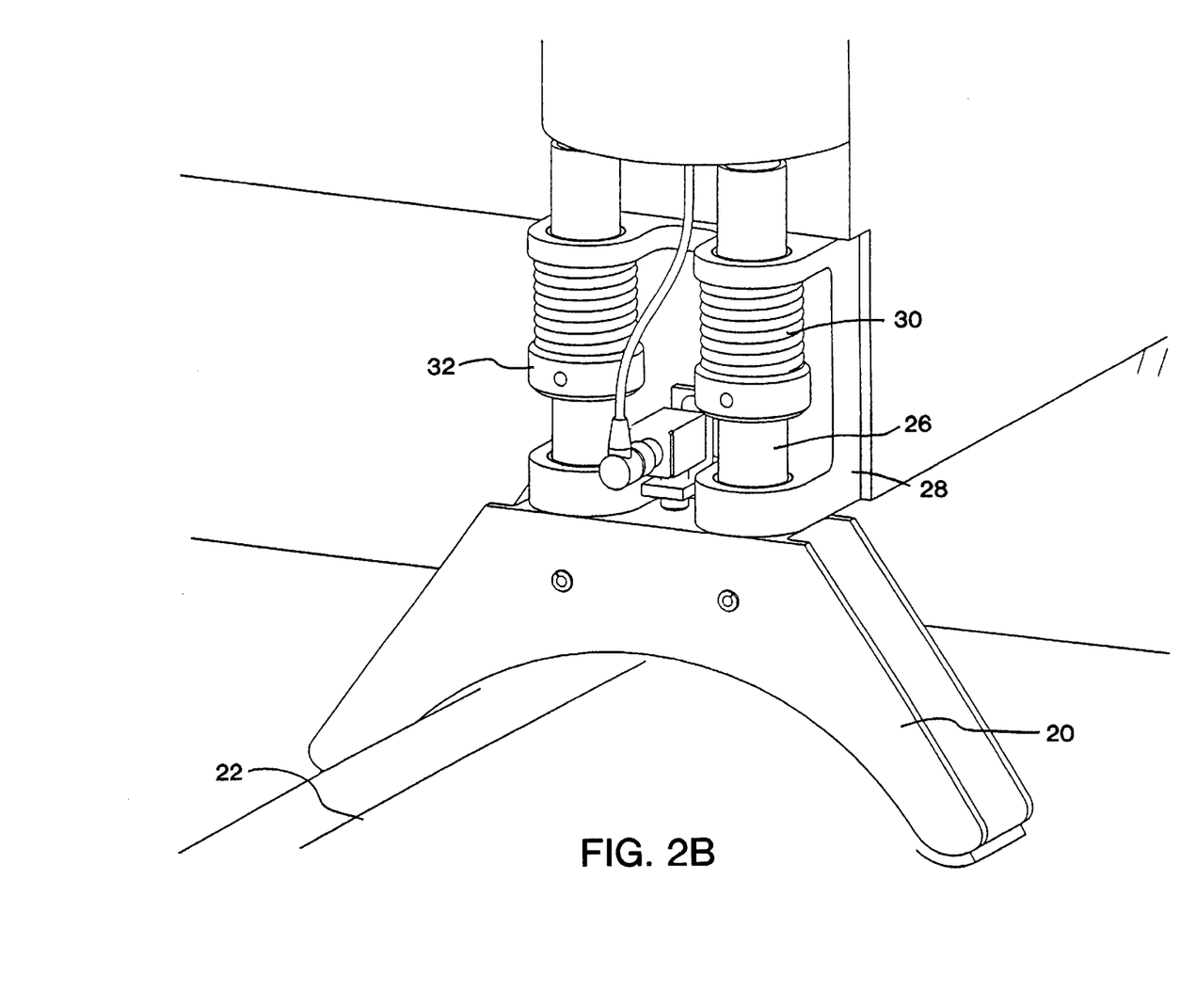

Referring now to FIGS. 2A and 2B, the salient features of the pylon stowage system 18 are shown in more detail. The stowage system 18 includes one or more swaybraces 20. In the illustrated embodiment, there is a forward swaybrace and an aft swaybrace. The swaybraces 20 are shaped to conform to a portion of a stowed item, e.g., a towed vehicle 22. In the illustrated embodiment, the swaybraces 20 include an arcuate surface that is configured to contact the towed vehicle 22. The arcuate surface preferably includes a store rest pad 24 that is made from a resilient material, such as urethane. Each swaybrace 20 has at least one, and more preferably two, guide shafts 26 extending upward from the swaybrace 20 and which slide within fittings 28 on the stores pylon 16. A compression spring 30 is located between the fitting 28 and a collar 32 on each shaft 26. The compression springs 30 apply a downward preload on the stowed item when attached to the stores pylon 16.

A proximity or limit switch 34 is mounted to the stores pylon 16 and is engaged when the stowed item 22 is winched into its completely stowed position (FIG. 2B). When engaged, the proximity switch sends a signal to turn the winch off, preventing further upward retraction of the stowed item 22. If the system includes a proximity switch on each swaybrace, then the winch is turned off only when both proximity switches are activated.

Referring back to FIG. 1, a roller bumper 36 is attached to the forward portion of the stores pylon 16 and includes one or more mounting brackets 38 that are attached to the stores pylon 16. A roller 40 is rotatably supported by the brackets 38. The roller 40 is preferably made from a soft resilient material, such as urethane. The roller 40 is designed to assist in guiding and positioning the stowed item during deployment and retrieval.

An articulated overhead pulley 42 is rotatably mounted to the stores pylon 16 and/or the pylon support 12. The pulley 42 directs a winch cable 44 which is attached to the towed vehicle 22 in a conventional manner. The winch cable 44 is engaged with a conventional winch 46 (shown in FIG. 3) that is located within the helicopter cabin. The winch 46 is controlled to feed and retract the winch cable 44 causing the towed vehicle to be raised and lowered. It should be readily apparent that the winch 46 and the winch cable 44 must be capable of lifting the stowed item 22. For example, a towed vehicle hanging from the aircraft can weigh upwards of 1500 pounds. Those skilled in the art would readily be capable of selecting the appropriate winch and cable for use in the present invention. One type of winch cable currently used for towing items includes fiber optic lines and electrical conductors for providing electrical and optical communication between the towed item and the aircraft.

Figure 3:
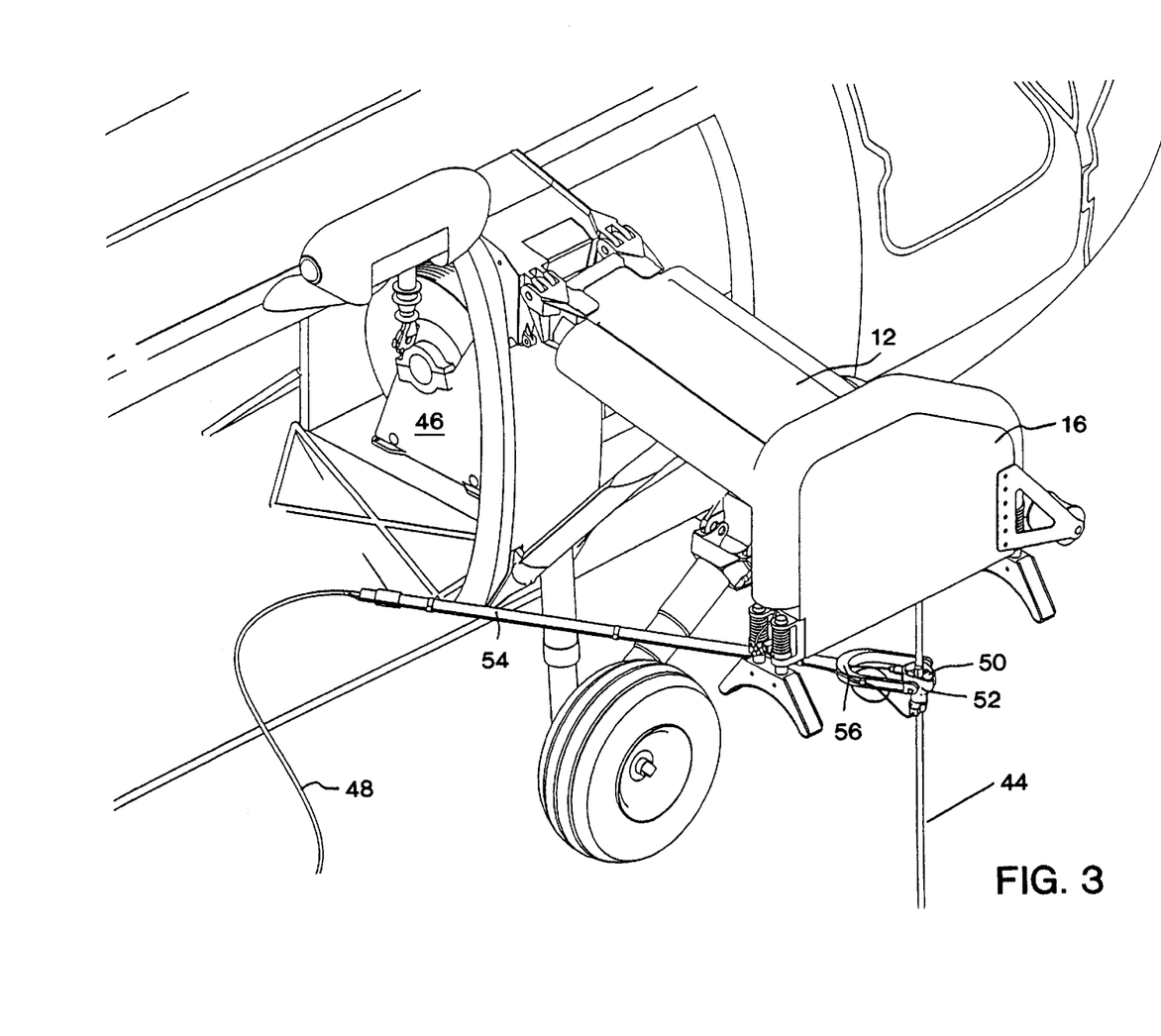
FIG. 3 is a partial isometric view of the helicopter with the towed vehicle lowered on a winch cable and a tow pole attached to the winch cable.
Figure 4:
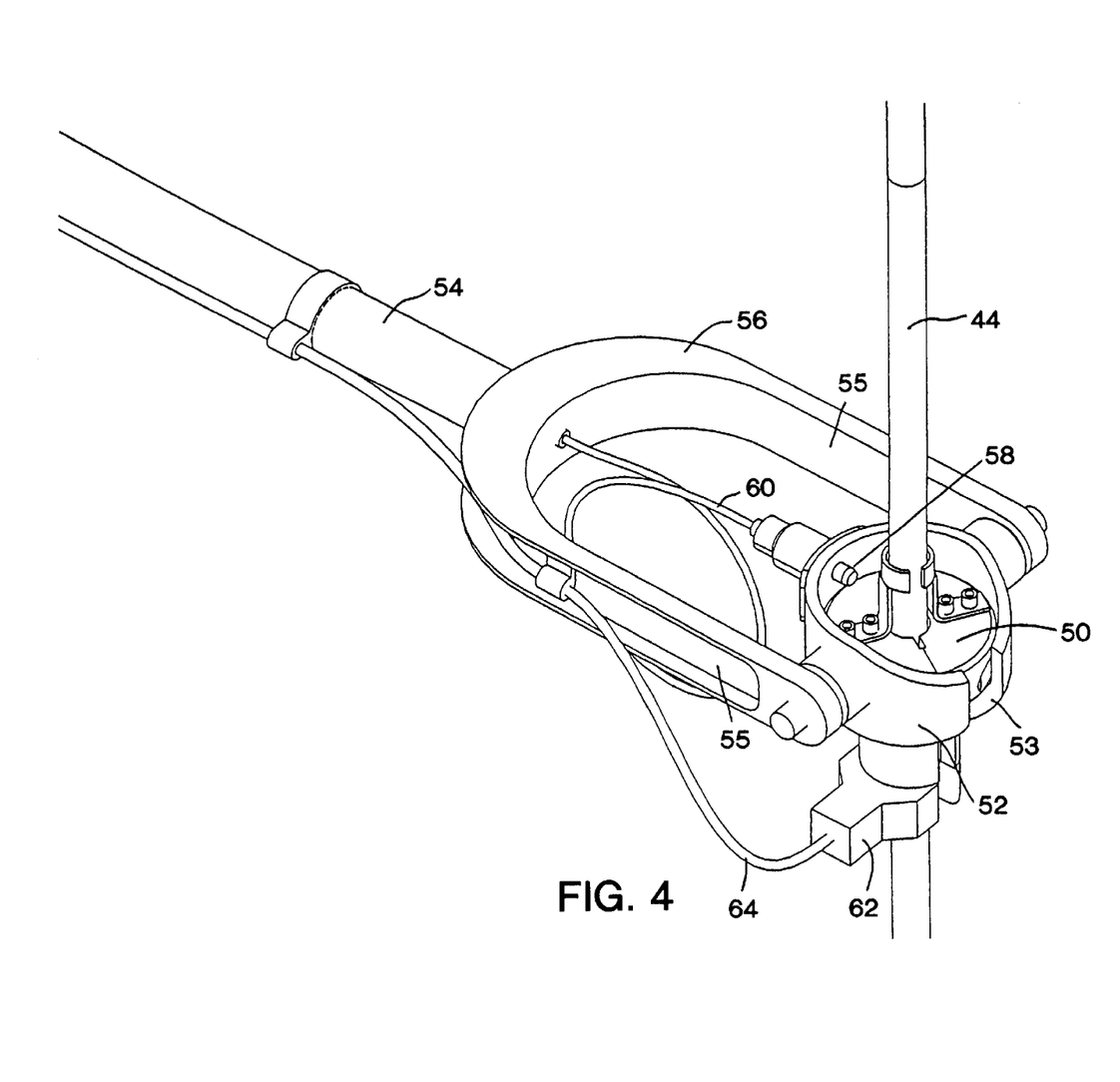
FIG. 4 is an enlarged isometric view of the attachment of the tow pole to the winch cable.

As discussed above, during operation, the towed vehicle 22 is submersed within the water. This results in significantly higher loads being imposed on the winch cable 44. If the winch 46 were to accommodate these high loads, it would have to be significantly larger and heavier. To minimize the size of the winch, the present invention transfers the towing loads from the winch to the aircraft. In order to do so, the winch cable 44 is attached to a tow cable 48 mounted on the aircraft. FIGS. 3 and 4 illustrate the engagement of the winch cable 44 with the tow cable 48. A tow ball 50 is attached to the winch cable 44 in a conventional manner, e.g., by clamping onto the cable. Tow balls on winch cables are conventional in the art and are currently used in the winching assemblies on the H-65 series helicopters. The tow ball 50 has a curved or semi-hemispherical lower surface that is designed to seat within a capture receptacle or cup 52 mounted on a tow pole 54. More particularly, the cup 52 is pivotally attached to two arms 55 of a yoke 56 formed on one end of the pole 54. The cup 52 has a slotted opening 53 which allows the winch cable 44 to pass through the cup 52 until the tow ball 50 seats within the cup 52. The tow pole 54 is of sufficient length to be held by a crewmember until the tow ball 50 seats in the cup 52.

A tow ball retainer lock pin 58 is mounted to the cup 52 and is connected to a control cable 60 that extends along the pole 54. The control cable 60 is attached to a return spring-loaded collar at the crewman's handle end (not shown) which allows the crewmember to lock and unlock the tow ball 50 within the cup 52.

A cable cutter 62 is mounted to the cup 52 adjacent to the winch cable 44. The cable cutter 62 is conventional in the art and is designed, upon actuation, to sever the winch cable 44. A control wire 64 connects the cable cutter 62 to a control source, such as in the cockpit, so as to permit the pilot the capability of jettisoning the towed article in case of emergency.

Figure 10:
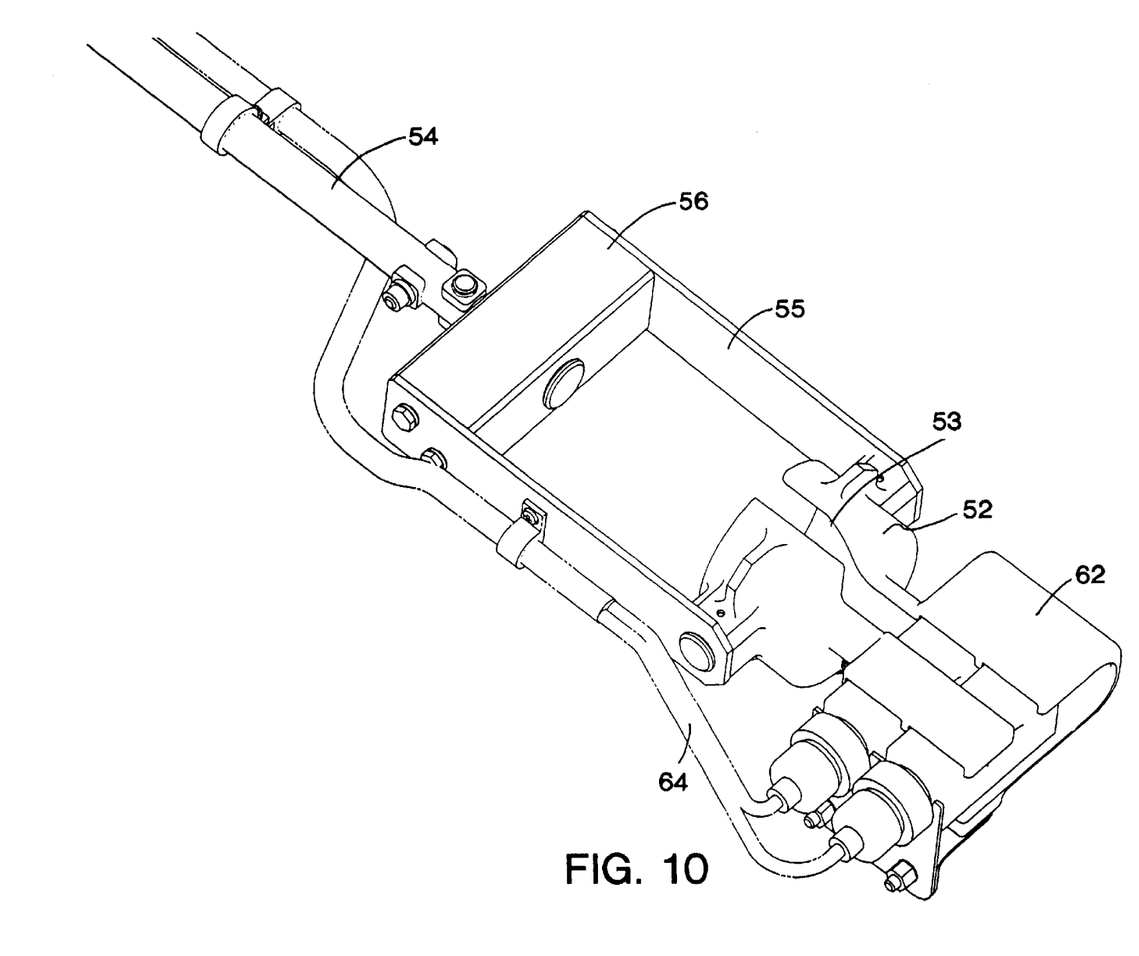
FIG. 10 is an enlarged isometric view of an alternate embodiment of the cup on the tow pole.

An alternate embodiment of the cup 52 and yoke 56 is shown in FIG. 10. In this embodiment, there are two cable cutters 62 to provide redundancy in the system in case of emergency.

The tow cable 48 is attached to the tow pole 54. As such, when the tow ball 50 is seated and locked within the cap 52, the winch cable 44 and towed vehicle 22 are attached to the tow cable 48 through the tow pole 54. As will become more apparent below, the attachment of the tow cable 48 to the winch cable 44 is designed to allow the tow cable 48, when taut, to carry most, if not all, of the towing loads, thus essentially unloading the winch 46.

Figure 5:
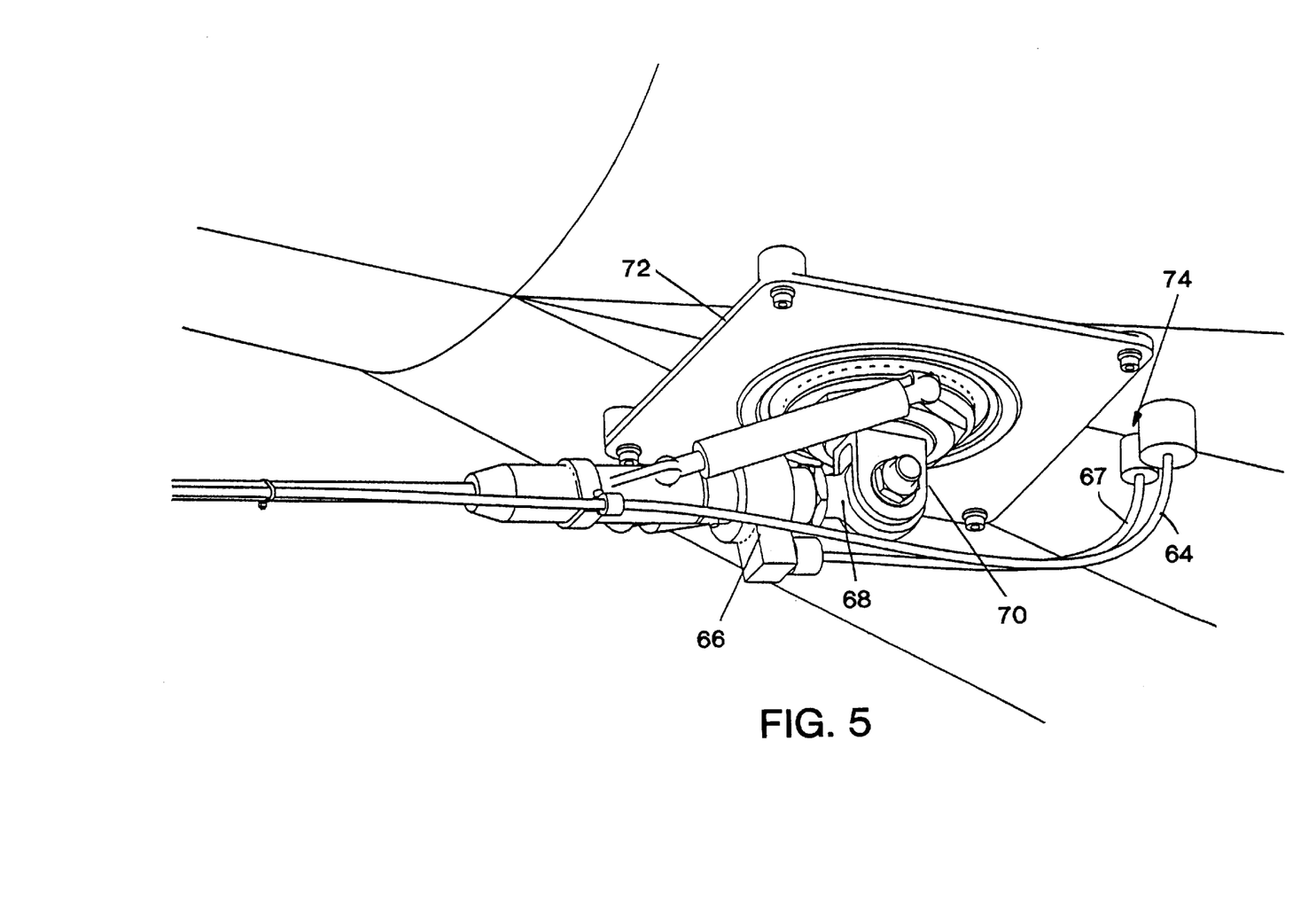
FIG. 5 is an enlarged isometric view of the attachment of a tow cable to the aircraft.

FIG. 5 shows the attachment of the tow cable 48 to the aircraft. The end of the tow cable 48 includes a cable tension in-line load cell 66 which is designed to sense tension loads on the tow cable 48. A lug 68 is formed on the load cell 66 and is pivotally attached to a universal joint roller bearing swivel 70 that is mounted on a mounting frame 72. The mounting frame 72 is removably attached to the aircraft in a suitable location, such as on the helicopter tailcone.

In order to control the cable cutter 62 and provide data from the towed vehicle (such as tow cable tension and tow line angle), an electrical interface 74 may be incorporated into the aircraft adjacent to the mounting frame. The control wire 64 for the cable cutter 62 and a control wire 67 from the load cell 66 attach to the electrical interface 74. The electrical interface 74 is connected to suitable electronics in the aircraft interior. Although not shown, a sensor can be incorporated in a conventional manner to monitor the skew angle of the tow cable 48.

Figure 6A:
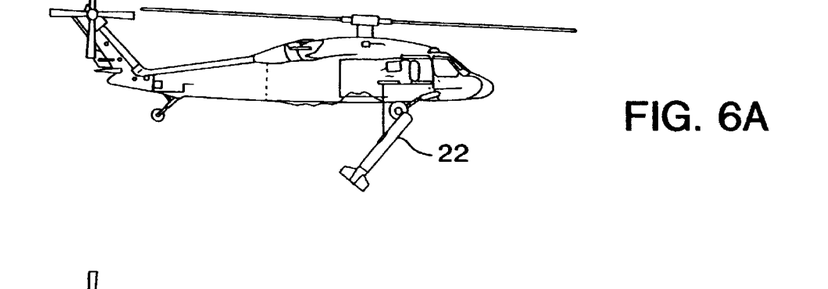
FIGS. 6A through 6H illustrate the operation of the deployment and retrieval system according to the present invention.
Figure 6B:
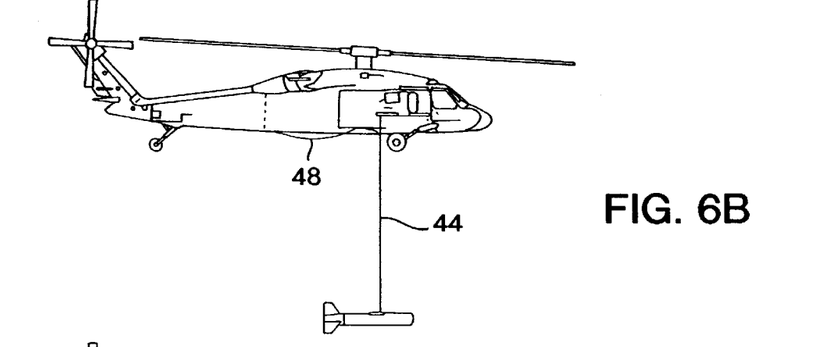

The operation of the deployment and retrieval system will now be described with reference to FIGS. 6A through 6H. The figures illustrate the various positions of the winch cable 44 and tow cable 48 during operation. FIG. 6A illustrates the towed vehicle 22 lowered a short distance from the stores pylon 16. At this point, the weight of the towed vehicle is being supported by the winch 46. When the towed vehicle 22 is in the position shown in FIG. 6B, a crewmember extends the tow pole 54 out of the aircraft and places the cup 52 around the winch cable 44 below the tow ball 50. As the winch 46 continues to lower the towed vehicle 22, the tow ball 50 seats within the cup 52. The locking pin 58 is actuated (either by the crewmember or by an automated mechanism) locking the tow ball 50 within the cup 52. The crewmember releases the tow pole 54 as the winch continues to stream the winch cable 44 and towed vehicle 22 downward.

Figure 6C:
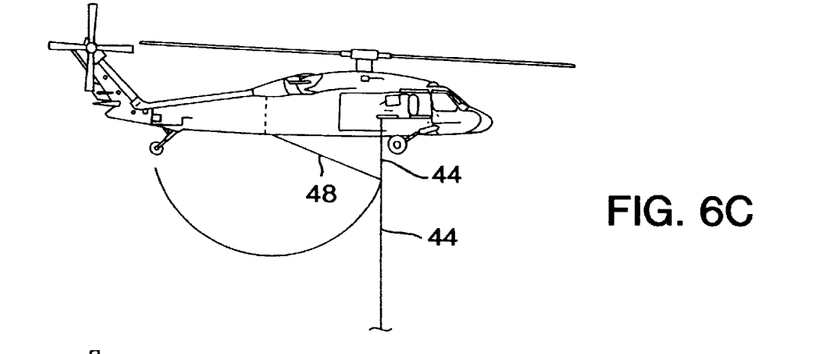
Figure 6D:
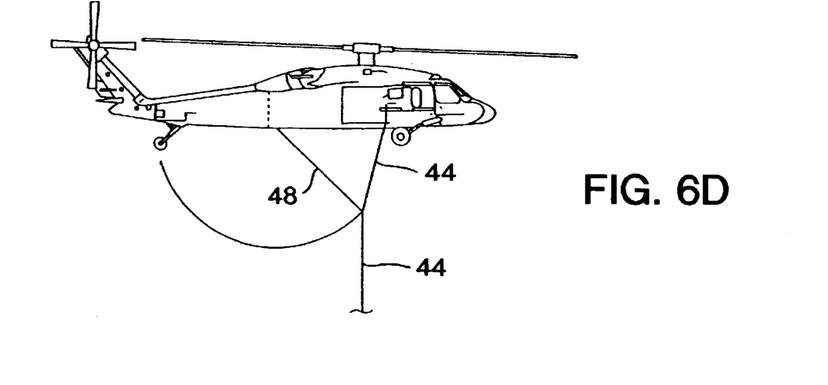
Figure 6E:
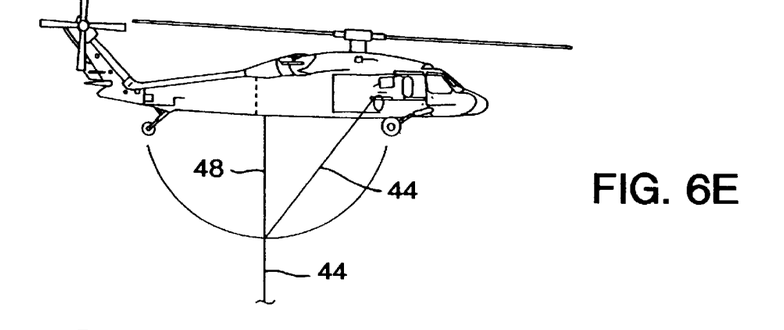
Figure 6F:
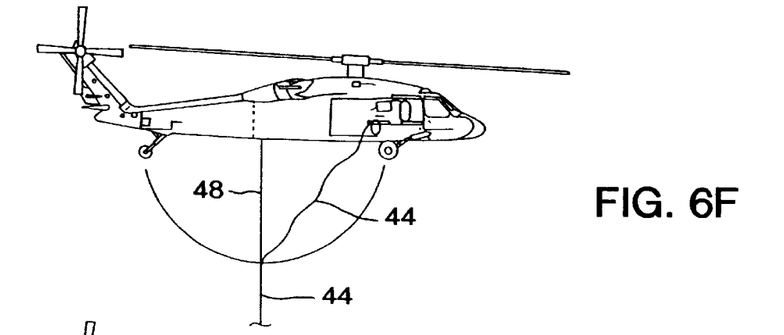
Figure 6G:
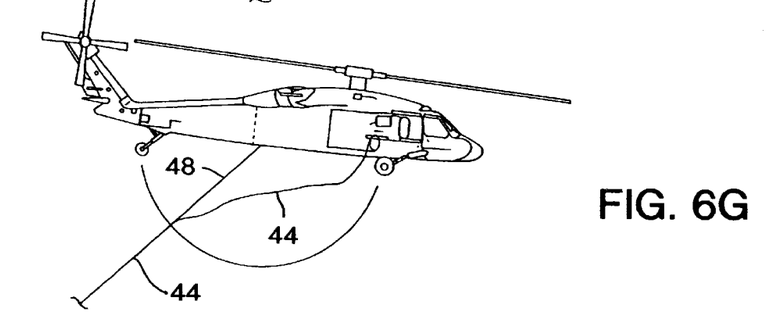
Figure 6H:
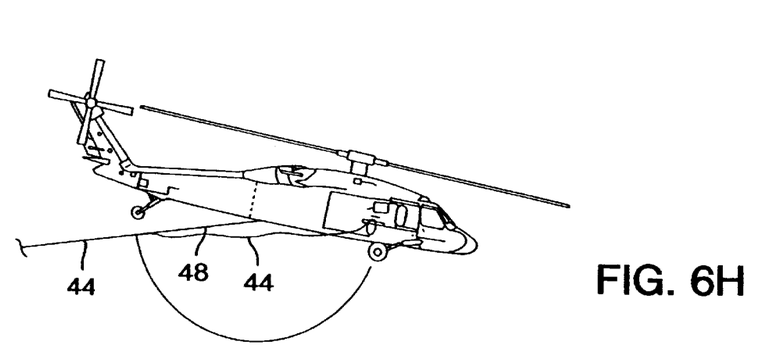

Since the towed cable 48 has a fixed length, it will become taut when it reaches its full extension as the winch 44 continues to lower the towed vehicle 22. This is shown in FIG. 6C. Starting at the point shown in FIG. 6C, the towed cable begins to carry a portion of the towed vehicle load. FIGS. 6E and 6F show the points where the load from the towed vehicle 22 is completely supported by the tow cable 48. Further streaming of the winch 46 results in the winch cable 44 becoming slack and allowing the tow cable 48 to transition completely aft to its towing position.

Figure 7:
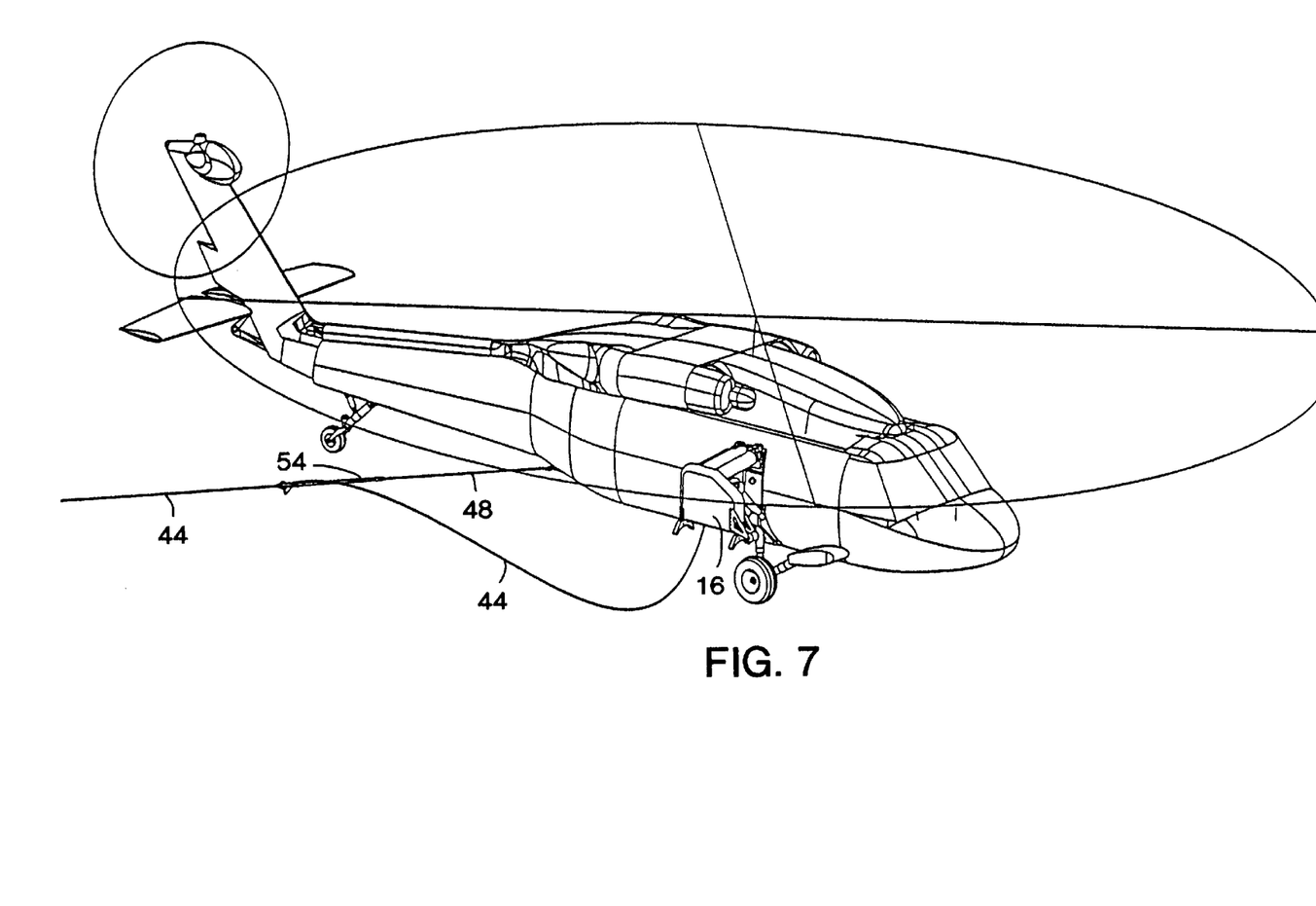
FIG. 7 is an isometric view of a Sikorsky Aircraft Corporation H-60 series helicopter illustrating the tow cable in its towing position.

FIG. 7 is an isometric view of a Sikorsky Aircraft Corporation H-60 series helicopter with the tow cable 48 in its towing position for towing the towed vehicle 22.

Fiber optic and/or electrical cables are incorporated into or attached to the winch cable 44 in a conventional manner for transmitting signals between the towed vehicle 22 and the aircraft.

The present invention provides a novel deployment and retrieval system for use in small and medium size aircraft that do not include a ramp and large cabin, such as a Sikorsky Aircraft Corporation H-60 series helicopter. The system can be easily retrofitted onto existing fleet aircraft, thus greatly expanding the number and availability of aircraft capable of performing an AMCM mission. In order to retrofit an aircraft, the mounting plate 72 is simply attached to a suitable support point on the aircraft (i.e., a point capable of accommodating the anticipated tow load of 6000 pounds). The stores pylon 16 and pylon support 12 are attached to the aircraft and the winch 46 and cable 44 are mounted within the cabin. The towed vehicle 22 is then attached to the stores pylon 16 and the aircraft is ready to perform the AMCM mission.

Figure 8:
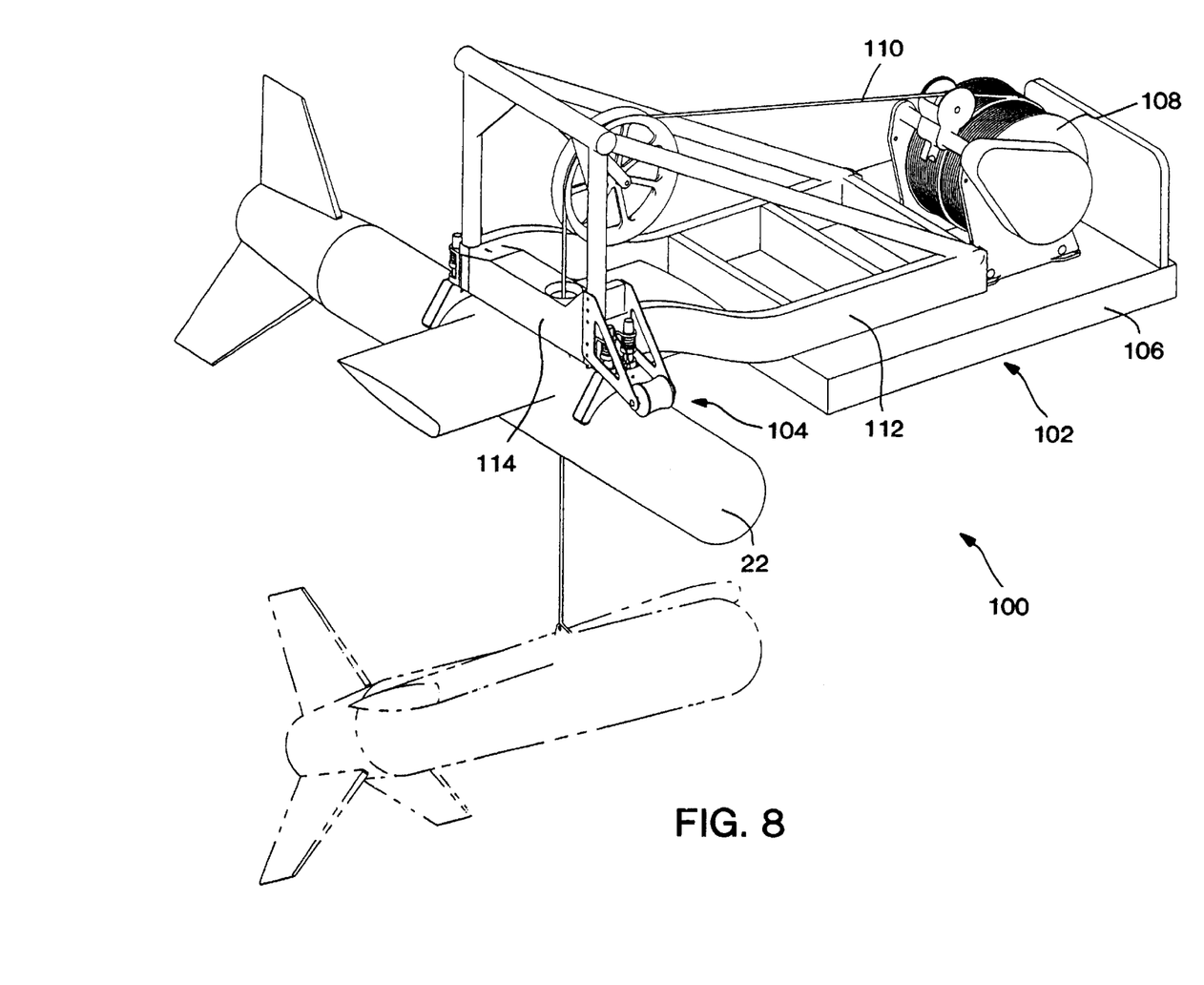
FIG. 8 is an isometric view of an alternate skid-mounted embodiment of the deployment and retrieval system according to the present invention.
Figure 9:
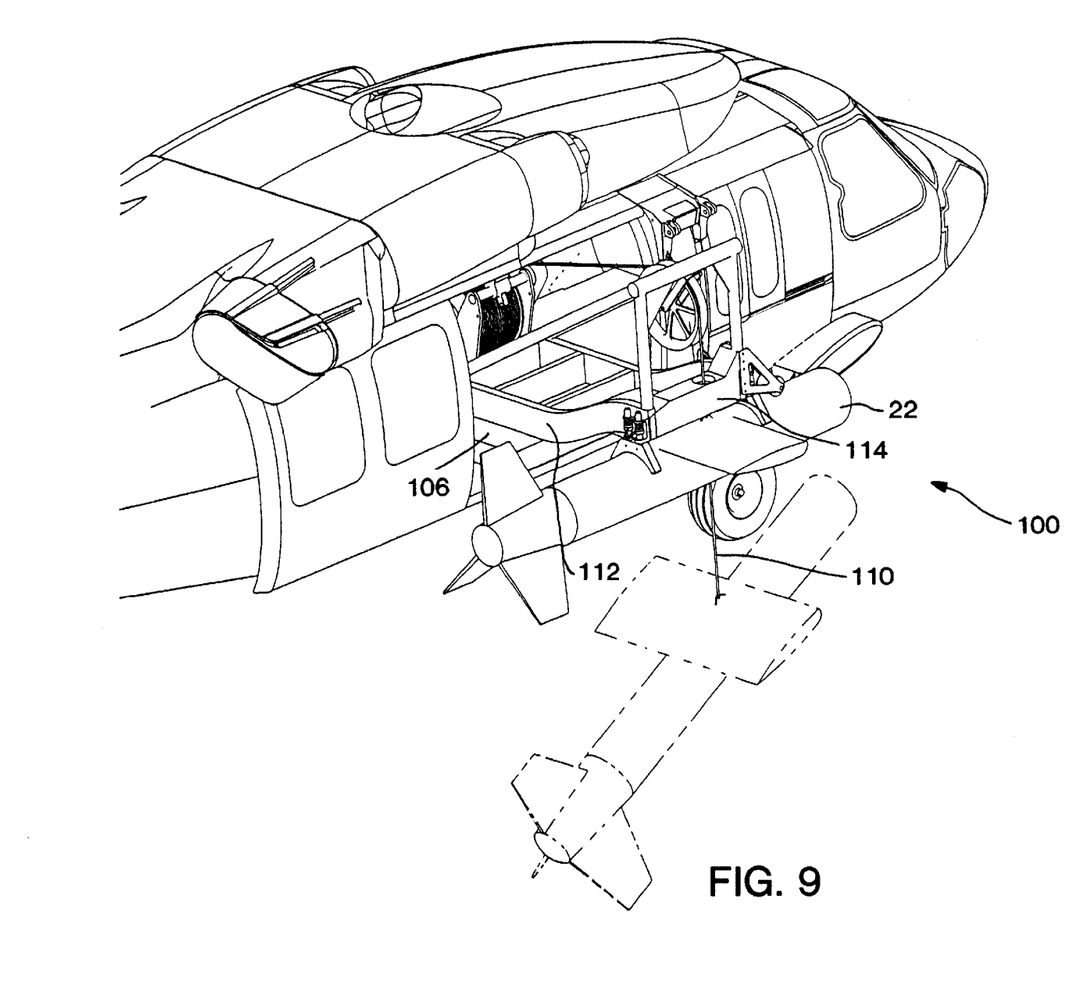
FIG. 9 is an isometric embodiment of an Sikorsky Aircraft Corporation H-60 series helicopter with the skid-mounted embodiment of the invention in FIG. 8.

An alternate embodiment of the deployment and retrieval system 100 is shown in FIGS. 8 and 9. In this embodiment, the pylon support and stores pylon are replaced with a skid mounted winching assembly 102. FIG. 8 shows the skid mounted winching assembly 102 with a towed vehicle 22 attached to the pylon stowage system 104 (solid lines) and suspended from the pylon stowage system 104 (phantom lines). FIG. 9 shows the skid mounted winching assembly as it is intended to be mounted in the door of a Sikorsky Aircraft Corporation H-60 series helicopter aircraft.

The frame assembly 102 includes a skid 106 which is designed to be strapped to the floor of the aircraft, e.g., attached to tie-down points. A conventional winch 108 is mounted on the skid 106 and includes a winch cable 110. A pylon frame or support 112 is attached to the skid 106. A stores pylon 114 is attached to the pylon frame 112. The pylon stowage system 104 is attached to the stores pylon 114. The pylon stowage system 104 is the same as described above. A pulley is rotatably mounted to the pylon frame 112 and directs the winch cable 110 from the winch 108 to the towed vehicle 22. The operation of the deployment and retrieval system in this embodiment of the invention is the same in the previous embodiment.

While the present invention has been described as using a manually engaged tow cable 48, it is also contemplated that the tow cable can be automatically engaged to the tow ball 50 on the winch cable 44. Those skilled in the art would readily be capable of modifying the mounting arrangement for providing such a mechanism.

Although the invention has been described and illustrated with respect to the exemplary embodiments thereof, it should be understood by those skilled in the art that the foregoing and various other changes, omissions and additions may be made therein and thereto without parting from the spirit and scope of the present invention.

What is claimed is:

1. A towed vehicle deployment and retrieval system for attachment to an aircraft comprising:

a pylon support adapted to mount to an aircraft and project outward therefrom;

a stores pylon adapted to mount to the pylon support, the stores pylon having at least one swaybrace reciprocally attached thereto for removably engaging with a towed vehicle;

a winch adapted to be mounted within the aircraft, the winch having a winch cable which is adapted to engage with the towed vehicle; and a tow cable adapted to be removably attached to the aircraft and adapted to engage with the winch cable.

2. The towed vehicle deployment and retrieval system according to claim 1 wherein there are two swaybraces and wherein each swaybrace is reciprocally attached to a fitting on the stores pylon with at least one spring located between each swaybrace and the corresponding fitting.

3. The towed vehicle deployment and retrieval system according to claim 2 wherein there is at least one limit switch mounted to the stores pylon which is activated by a swaybrace when the swaybrace compresses the spring a predetermined amount, the limit switch providing a signal when activated which shuts the winch off.

4. The towed vehicle deployment and retrieval system according to claim 1 further comprising a mounting frame adapted to be attached to the aircraft, the tow cable being rotatably and pivotally attached to the mounting frame.

5. The towed vehicle deployment and retrieval system according to claim 1 further comprising a tow pole attached to the tow cable, the tow pole having a cup pivotally attached to one end which is adapted to engage with a tow ball formed on the winch cable, the engagement of the tow ball with the cup providing engagement between the winch cable and the tow cable.

6. The towed vehicle deployment and retrieval system according to claim 1 wherein the stores pylon includes an articulated pulley mounted thereon which directs the winch cable from the winch to the towed vehicle.

7. The towed vehicle deployment and retrieval system according to claim 1 further comprising a roller bumper mounted to the stores pylon for guiding the towed vehicle during deployment and retrieval.

8. The towed vehicle deployment and retrieval system according to claim 1 further comprising a tow frame attached to the tow cable, the tow frame having bolt holes for removably engaging with a portion of the aircraft.

9. The towed vehicle deployment and retrieval system according to claim 8 wherein the tow cable includes an in-line load cell for detecting the tension load on the cable.

10. A helicopter for use in an airborne mine countermeasures mission, the helicopter comprising:
   a fuselage;
   a pylon support mounted to and projecting outward from the side of the aircraft;
   a stores pylon mounted to the pylon support and having at least one swaybrace reciprocally attached thereto;
   a towed vehicle removably engaged to the stores pylon through the at least one swaybrace;
   a winch mounted within the aircraft and having a winch cable which is attached to the towed vehicle, the winch adapted to feed and retrieve the winch cable; and
   a tow cable removably mounted to the aircraft and adapted to engage with the winch cable.

11. A method of deploying and retrieving a towed vehicle from an airborne aircraft comprising the steps of:
   providing a stores pylon externally mounted to the aircraft;
   providing a towed vehicle removably engaged with the stores pylon;
   feeding a winch cable to cause the towed vehicle to move away from the aircraft;
   attaching a predetermined length tow cable to the winch cable, the tow cable being mounted to a location on the outside of the aircraft that is spaced apart from the stores pylon; and
   feeding the winch cable until the tow cable is taut and fully supporting the towed vehicle in a towed position.

12. the method of claim 11 wherein the step of attaching the tow cable to the winch cable includes the steps of:
   extending a tow pole out of the aircraft;
   capturing the winch cable with a cup on the tow pole; and
   engaging a tow ball on the winch cable with the cup.

13. The method of claim 12 wherein the method further comprises the step of attaching an end of the tow cable to the aircraft fuselage.

14. A method of deploying and retrieving a towed vehicle from an airborne aircraft comprising the steps of:
   lowering a towed vehicle from an external pylon mount on an aircraft on a winch cable;
   attaching a tow cable to the winch cable with a tow pole; and
   feeding the winch cable until the tow cable is taut and fully supporting the towed vehicle in a towed position.

15. The method of claim 14 wherein the step of attaching the tow cable to the winch cable includes the steps of:
   extending a tow pole out of side of the aircraft;
   capturing the winch cable with a cup on the tow pole; and
   engaging a tow ball on the winch cable with the cup.

16. A towed vehicle deployment and retrieval system for insertion into the cabin of an aircraft comprising:
   a pylon support mounted to a skid and projecting outward therefrom, the skid adapted to be slid into a helicopter cabin;
   a stores pylon mounted the pylon support, the stores pylon having at least one swaybrace reciprocally attached thereto for removably engaging with a towed vehicle; and
   a winch mounted to the skid and having a winch cable which is adapted to engage with the towed vehicle.

* * * * *